(12) United States Patent
Kiguchi et al.

(10) Patent No.: US 6,949,732 B2
(45) Date of Patent: Sep. 27, 2005

(54) OPTICAL APPARATUSES USING THE NEAR-FIELD LIGHT

(75) Inventors: Masashi Kiguchi, Kawagoe (JP);
Takuya Matsumoto, Hachioji (JP);
Tomohiro Hashizume, Hatoyama (JP);
Isamu Orita, Kokubunji (JP)

(73) Assignee: Hitachi Ltd., Tokyo (JP)

( * ) Notice: Subject to any disclaimer, the term of this patent is extended or adjusted under 35 U.S.C. 154(b) by 191 days.

(21) Appl. No.: 10/046,249

(22) Filed: Jan. 16, 2002

(65) Prior Publication Data

US 2003/0015651 A1 Jan. 23, 2003

(30) Foreign Application Priority Data

Jul. 18, 2001 (JP) ......................................... 2001-217545

(51) Int. Cl.⁷ .............................. H01J 3/14; G02F 1/00
(52) U.S. Cl. ...................... 250/216; 250/234; 250/306; 359/321; 359/738
(58) Field of Search ................................. 250/216, 234, 250/306, 307, 225, 559.09; 73/105; 359/321, 738

(56) References Cited

U.S. PATENT DOCUMENTS

| | | | | |
|---|---|---|---|---|
| 4,571,650 A | * | 2/1986 | Ojima et al. ............. 369/13.16 |
| 4,725,727 A | * | 2/1988 | Harder et al. ........... 250/227.28 |
| 4,869,569 A | * | 9/1989 | Kapon ........................... 385/2 |
| 4,909,082 A | * | 3/1990 | Khuri-Yakub et al. ......... 73/642 |
| 5,288,999 A | * | 2/1994 | Betzig et al. ........... 250/227.26 |
| 5,321,502 A | * | 6/1994 | Matsumoto et al. ........ 356/490 |
| 5,488,681 A | * | 1/1996 | Deacon et al. |
| 5,515,719 A | * | 5/1996 | Lindsay ......................... 73/105 |
| 5,696,372 A | * | 12/1997 | Grober et al. ............... 250/216 |
| 5,708,638 A | * | 1/1998 | Braat et al. ............... 369/44.29 |
| 5,739,527 A | * | 4/1998 | Hecht et al. ................. 250/234 |
| 5,770,855 A | * | 6/1998 | Fischer ........................ 250/216 |
| 5,796,102 A | * | 8/1998 | Van Kempen et al. ...... 250/306 |
| 5,838,000 A | * | 11/1998 | Mertesdorf et al. ......... 250/234 |
| 5,859,364 A | * | 1/1999 | Toda et al. .................... 73/105 |
| 5,939,709 A | * | 8/1999 | Ghislain et al. ............ 250/216 |
| 5,960,147 A | * | 9/1999 | Muramatsu et al. ........ 385/123 |

(Continued)

FOREIGN PATENT DOCUMENTS

| | | | | |
|---|---|---|---|---|
| EP | 1063641 A1 | * | 12/2000 | ............. G11B/7/00 |
| JP | 6-137847 | | 5/1994 | ............. G01B/11/30 |
| JP | 11-102009 | | 4/1999 | ............. G03B/17/28 |
| JP | 11-250460 | | 9/1999 | ............. G11B/7/00 |
| JP | 200067459 A | * | 3/2000 | ............. G01H/1/08 |
| JP | 2000-298132 | | 10/2000 | ............. G01N/37/00 |

OTHER PUBLICATIONS

Saiki, et al., "Tailoring a high–transmission fiber probe for photon scanning tunneling microscope", Appl. Phys. Lett. 68 (19), May 6, 1996, pps. 2612–2614.

Oesterschulze, et al., "Transmission Line Probe on Base of a Bow–Tie Antenna", Congress Center, p. 100, no date.

Oesterschulze, et al., "Transmission Line Probe Based on a Bow–Tie Antenna", Journal of Microscope, vol. 202, Pt. 1, Apr. 2001, pps. 39–44.

*Primary Examiner*—Gail Verbitsky
(74) *Attorney, Agent, or Firm*—Antonelli Terry Stout & Kraus LLP

(57) ABSTRACT

Optical apparatuses are provided that use near-field light, where high spatial resolution and high sensitivity are made compatible. Highly intense near-field light is generated in a narrow area using localized plasmons that are produced in a metal pattern 106 in a shape that bears anisotropy and is made to irradiate a measured subject. The direction of polarization 104 of incident light 103 is modulated and signal light is subjected to synchronous detection, so that background light is removed and high sensitivity is achieved.

9 Claims, 11 Drawing Sheets

U.S. PATENT DOCUMENTS

| | | | | |
|---|---|---|---|---|
| 6,006,594 A | * | 12/1999 | Karrai et al. | 73/105 |
| 6,025,913 A | * | 2/2000 | Curbelo | 356/453 |
| 6,046,448 A | * | 4/2000 | Sato et al. | 250/234 |
| 6,052,238 A | | 4/2000 | Ebbesen et al. | |
| 6,100,991 A | * | 8/2000 | Challener | |
| 6,127,681 A | * | 10/2000 | Sato et al. | 250/306 |
| 6,239,080 B1 | * | 5/2001 | Chu et al. | |
| 6,248,486 B1 | * | 6/2001 | Dirksen et al. | 430/30 |
| 6,271,921 B1 | * | 8/2001 | Maris et al. | 356/432 |
| 6,359,852 B1 | * | 3/2002 | Ueyanagi | 369/118 |
| 6,400,449 B2 | * | 6/2002 | Maris et al. | 356/72 |
| 6,408,123 B1 | * | 6/2002 | Kuroda et al. | 385/130 |
| 6,424,407 B1 | * | 7/2002 | Kinrot et al. | 356/28 |
| 6,469,288 B1 | * | 10/2002 | Sasaki et al. | 250/201.3 |
| 6,515,277 B1 | * | 2/2003 | Kley | 250/234 |
| 6,529,277 B1 | * | 3/2003 | Weitekamp | 356/445 |
| 6,535,283 B1 | * | 3/2003 | Heffels et al. | 356/300 |
| 6,625,109 B1 | * | 9/2003 | Mitsuoka et al. | 369/300 |
| 6,649,894 B2 | * | 11/2003 | Matsumoto et al. | 250/201.3 |
| 6,710,331 B2 | * | 3/2004 | Narita et al. | 250/234 |
| 6,738,338 B1 | * | 5/2004 | Maeda et al. | 369/112.01 |
| 6,768,556 B1 | * | 7/2004 | Matsumoto et al. | 356/601 |
| 6,777,656 B2 | * | 8/2004 | Narita et al. | 250/201.3 |
| 2002/0006245 A1 | * | 1/2002 | Kubota et al. | |
| 2002/0024004 A1 | * | 2/2002 | Shimada et al. | |
| 2002/0064341 A1 | * | 5/2002 | Fauver et al. | 385/25 |
| 2002/0115304 A1 | * | 8/2002 | Matsudo et al. | 438/769 |
| 2002/0154859 A1 | * | 10/2002 | Kuroda et al. | 385/31 |
| 2002/0166957 A1 | * | 11/2002 | Oumi et al. | 250/234 |
| 2003/0036204 A1 | * | 2/2003 | Stark et al. | 436/172 |
| 2003/0047675 A1 | * | 3/2003 | Proksch et al. | 250/234 |
| 2004/0169136 A1 | * | 9/2004 | Inoue et al. | 250/234 |
| 2004/0182140 A1 | * | 9/2004 | Weide et al. | 73/105 |
| 2004/0188602 A1 | * | 9/2004 | Chinn et al. | 250/234 |

* cited by examiner

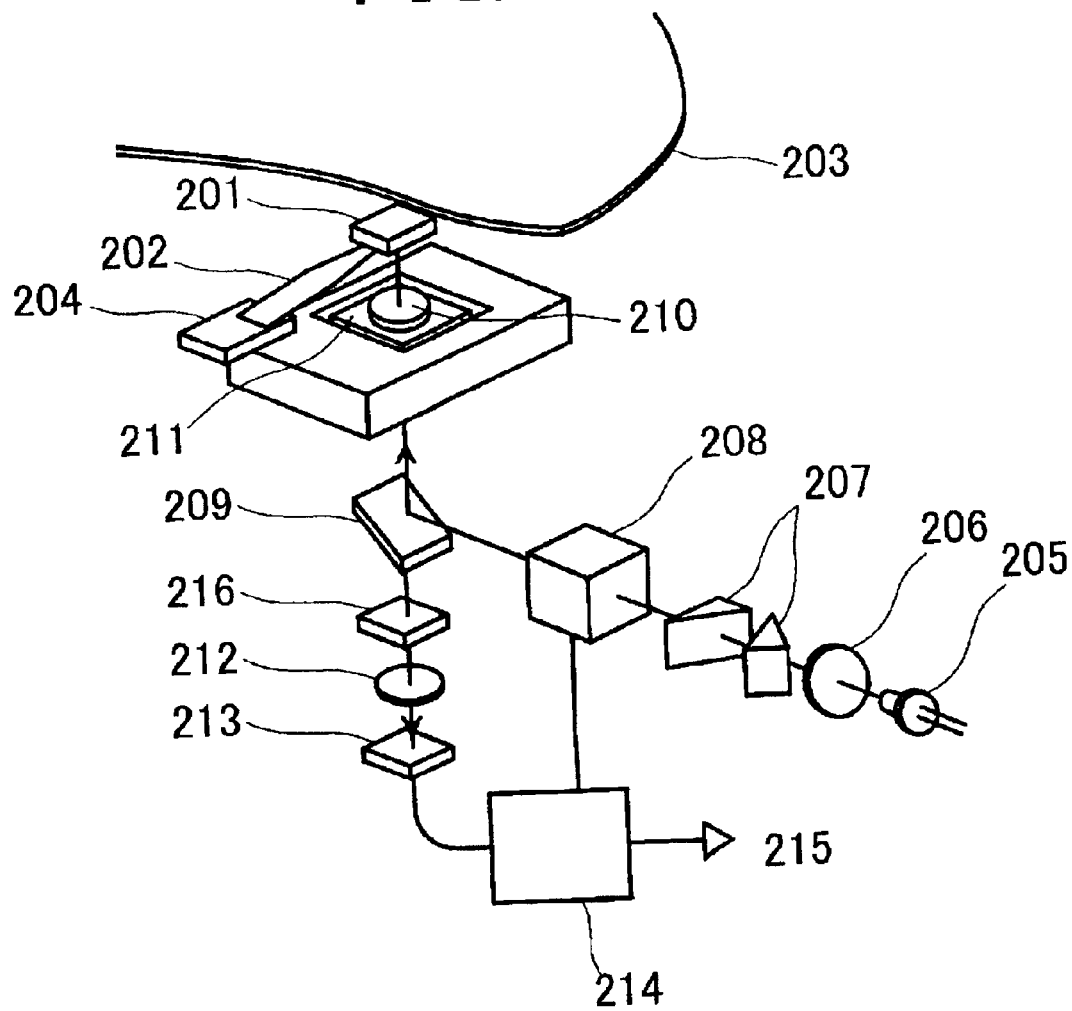

OPTICAL APPARATUSES USING THE NEAR-FIELD LIGHT

BACKGROUND OF THE INVENTION

The present invention relates to optical apparatuses that use the near-field light, such as optical microscopes, optical measurement instruments, spectroscopic instruments, and optical recording/reproduction apparatuses.

In the conventional optical microscope, light is focused with lenses. In this case, the spatial resolution is limited by the light wavelength.

On the other hand, the near-field optical microscope uses a probe having a microstructure whose dimensions are of an order of nanometer, for example, a micro aperture whose diameter is of an order of nanometer. When the microstructure is irradiated with light, localized light called near-field light is generated in the vicinity thereof. If the microstructure is brought close to a sample and the object (the sample) is illuminated with the near-field light, the localized near-field light is converted to propagating light, depending on the complex refractive index of the sample, that can be observed by a light detector at a distance. Since its intensity depends upon optical characteristics of the sample, scanning the microstructure on the surface of the sample makes it possible to measure the optical characteristics of the sample with a spatial resolution determined by the size of the microstructure. Recently, this technology has begun to be applied to a wide range of fields, such as various optical measurements, high-density optical recording, and light machining.

A near-field light probe that is most widely used is a sharply pointed optical fiber with a metal cladding and having an aperture smaller than the light wavelength on a top end thereof. However, generation efficiency of the probe is low. For example, in the case of an optical fiber having a micro aperture of 100 nm, the light intensity emitted from the fiber is 0.001% or less of the light intensity that has entered the fiber (1-1 Applied Physics Letters, Vol. 68, pp. 2612–2614, 1996.) This low level of efficiency becomes a problem when the near-field light technologies are applied to various fields.

Thus, to increase the generation efficiency of the near-field light, methods that use localized plasmon excitation in metals have been proposed, as in the following. That is, there are: (1) a method that uses a metal probe of the scanning tunnel microscope (1-2, "Unexamined Patent Application Laid-Open, No. H06-137847") (2) a method that uses a metallic micro sphere provided on the center of the aperture of the micro aperture fiber probe (1-3 "Unexamined Patent Application Laid-Open, No. H11-102009"); (3) a method that uses a probe where metal scattering members are provided on a button surface of a glass substrate (1-4) "Unexamined Patent Application Laid-pen, No. H11-250460"); (4) a method that uses a triangular metal pattern provided on a flat substrate ("Unexamined Patent Application Laid-Open, No. 2000-73922" applied for by the same applicant as that of this application); (5) a method that uses a quadrangular pyramid with metal films formed on two side faces thereof, (1-5 "Technical Digest of 6th International Conference on Near Field Optics and Related Techniques", the Netherlands, Aug. 27–31, 2000, pp. 100"). Compared to the above-mentioned conventional methods (1) through (3), the conventional (4) can yield intense near-field light and its fabrication is easy.

When a scattering-type probe is used, removal of background light is important, as will be described later. As means for achieving this, (b) a method whereby the probe is vibrated and only the optical signal that is synchronized with the vibration is detected is disclosed in "Unexamined Patent Application Laid-Open, No. H06-137847." Further, as another means, a method whereby a difference between amplitudes of two mutually orthogonal polarized lights is taken is disclosed in "Unexamined Patent Application Laid-Open, No. 2000-298132."

The above-mentioned conventional methods (1) through (5) each realize generation of the intense near-field light, but contain a problem in that light passes through a part other than the metallic surface and acts as background light, which brings on a decrease in the S/N (signal-to-noise) ratio of the detected signal.

Use of localized plasmon excitation can increase the square of an absolute value of the electric field strength of the near-field light, namely the photon density per unit area. However, the total number of photons of the near-field light, namely a value obtained by integrating the above-mentioned photon density for a localized area of the near-field light, becomes not so large because of the small area resulting from the objective of increasing the spatial resolution.

Conversely, although the background light is small in comparison to the electric field strength, it has an area larger than the diffraction limit; therefore, it is often the case that the total number of photons becomes measurably large. Assuming that the area of the near-field light is 1/S times the area of the background light (5) and the absolute value squared of the electric field strength of the near-field light is G times that of the background light, the total number of photons of the near-field light becomes G/S times that of the background light For example, in the above-mentioned method (4), the absolute value squared of the electric-field strength of the near-field light that is localized in an area of 5 nm by 5 nm is 5700 times that of the incident light, but the area of the background light, whose number of photons is equivalent to the number of photons of this near-field light, becomes 380 nm by 380 nm.

This value is not more than the diffraction limit of the near-infrared laser light commonly used as a light source, and consequently, with a normal device configuration, the number of photons of the background light becomes larger than that of the near-field light. In the case where nonlinear interaction is used as in optical recording, this background light causes no problem because the interaction is affected not by the total number of photons, but by the number of photons per unit area. However, in the case, such as normal optical reproduction and the near-field optical microscope, where a portion of the near-field light is scattered by the sample and the amount of the light entering a detector is observed, the background light similarly enters a detector, and hence, the S/N ratio (signal-to-noise ratio) becomes smaller than unity. Also, in the case where secondary light from the sample, such as fluorescent light and Raman light, is observed as signal light, the same problem is involved because secondary light generated by the above-mentioned background light becomes a background signal.

Up to this point, a simple comparison of the number of photons in the vicinity of the sample was considered. Besides, in the above-mentioned conventional methods (1), (3), and (5), the background light is propagating light, the background light enters the detector generally with a higher degree of efficiency compared to the efficiency at which the near-field light, that is non-propagating light, is scattered and enters the detector placed in the distance, and hence the S/N ratio decreases further.

To solve this problem, in the conventional methods (2) and (4), the background light is suppressed by shading the periphery of a metal pattern for exciting localized plasmons with an aperture having dimensions not more than the light wavelength remained. However, when dielectric materials are used as shading materials, it is difficult to achieve a sufficient shading property, and further problems, such as generation of heat, may occur.

When a metal with a high shading effect is used to avoid these problems, the following problem occurs. If there exists a metal that has a plane parallel to a vibrating direction of the localized plasmons, an inverse electric field is generated inside the above-mentioned metal which inhibits the plasmon excitation. In other words, when a metal for shading that forms an aperture is brought close to the metal for exciting the localized plasmons, the excitation of the localized plasmons is inhibited, and, hence, the intensity of the near-field light is decreased. Further, depending upon the shape of the metal for shading and the direction of polarization of the incident light, the localized plasmons are exited also in the metal for shading to effect reduction in spatial resolution. Therefore, the aperture cannot be made sufficiently small, and, consequently, there is a limit to the amount that the S/N ratio can be compared. Moreover, since the dimensions of the excitation area of the localized plasmons are determined by the radius of curvature of a sharply pointed part of the metal, the metal top end needs to be sharpened in order to improve the spatial resolution, and, for this reason, the thicknesses of the metal for shading and of the metal for exciting the localized plasmons at the top end cannot be increased. Therefore, light passes through this part and becomes background light, which presents a problem in that it results in a decease in the S/N ratio all the same.

Moreover, in the above-mentioned conventional method (7), a technique is employed whereby the background light is removed through the interference of two mutually orthogonal polarized lights. However, since this method uses a scattering-type probe, a shading plate for shading the background light etc. cannot be installed due to its configuration, resulting in an increase In the absolute amount of the background light, and the wavefront of the background is deformed in consequence of the scattering by the sample and the probe as a whole; therefore, it is difficult to completely remove the background light merely using interference. In addition, the surface conditions of the sample govern how the wavefront is deformed, and, consequently, the elimination of the background light is also affected by the surface conditions of the sample.

SUMMARY OF THE INVENTION

It is the object of the present invention to remove the background light presenting the above-discussed problem without sacrificing the spatial resolution in optical apparatuses that use the near-field light, and to provide optical apparatuses that can achieve an excellent S/N ratio.

To enhance the intensity of the near-field light, it is effective to use plasmon excitation in a metal. By using a metal of micro dimensions, the localized plasmons can be excited and intense near-field light is generated in its periphery.

To remove the background light, a metal for shading is provided and in its opening a metal for exciting plasmons is provided. This has been disposed in the above-mentioned conventional methods (2), (4), but the present invention provides the following means to achieve an even higher S/N ratio.

The metal for shading and the metal for exciting plasmons may be the same, but if the kind and the thickness of each metal are selected, respectively, it becomes possible to control the light shading property and the resolution independently. Further, the background light that has passed through either of the above-mentioned opening part or the metal thin film part is removed by the method mentioned below.

The intensity of plasmons excited in a metal having an asymmetric form, as described in the above-mentioned publications (4) and (5), namely the intensity of the near-field light, depends upon the direction of polarization of the incident light. On the other hand, the intensity of the background light can be deprived of its polarization dependency easily. In the case of a planar probe, adoption of normal incidence removes the polarization dependency, and in the case of a multiangular pyramid probe, by forming a metal coating thereon and controlling its thickness, the polarization dependency can be inhibited to a large extent. Further, the polarization dependency of the intensity of the background light can be canceled out with the use of a polarization compensator that has inverse polarization dependency to this. Therefore, if the direction of polarization of the incident light is modulated and the intensity of the detected light is subjected to synchronous detection relative to the above-mentioned modulation, signals resulting from the background light can be removed and only the near-field light signal can be extracted.

In accordance with this invention, the probe is provided with a metal for shading to reduce the background light. In addition, the background light that leaks out even with this contrivance is removed by taking the difference of the light intensity (square of light amplitude) rather than the light amplitude.

Since the present invention does not use the interference of light, the operation of the optical apparatus is not affected by how the wavefront is deformed, and so it is resistant to the surface-state of the sample; therefore, the elimination factor of the background light to the sample can be boosted.

Besides, the present invention can be applied to the observation of secondary light from a sample, such as fluorescent light and Raman light. In the case where fluorescent light from a sample is observed, since the fluorescent light generated from a part excited by the incident background light is observed as the background light, in addition to the signal fluorescent light from a local part excited by the near-field light, the S/N ratio experiences a deterioration. The background fluorescent light cannot be removed by means of the interference because the phase information has been lost in the fluorescent light. Since the present invention does not the interference, the background secondary light signal can be removed from the secondary light signal from a fluorescent sample etc., and therefore, the invention can find applications in micro fluorescence spectroscopic instruments, micro Raman spectroscopic instruments, etc.

Thus, as described above, the optical apparatus that uses the near-field light according to the present invention is characterized in that it comprises: a metal member that is disposed on a substrate and has a caspidal or tip part; a light source device for modulating the direction of polarization; an optical member for irradiating the caspidal or tip part of the above-mentioned metal member with light from the light source device; a detector that detects light that has passed through the sample or light either reflected or scattered by the sample, which sample is illuminated with the near-field light generated from the thus irradiated caspidal or tip part of the metal member; and a separator for extracting a signal that is synchronized with the polarization modulation from an electric signal outputted from the detector.

Further, an optical apparatus that uses the near-field light according to the present invention is characterized in that it comprises: a light source device for modulating the direction of polarization; a probe on which one or more metal members, each having a caspidal or tip part, are provided; a sample stage for holding the sample; a distance controller for controlling the distance between the sample and the probe; an optical member for irradiating the tip part of the above-mentioned metal member with the light from the light source device; one or a plurality of detectors for irradiating the sample with the near-field light generated from the probe and detecting the signal light radiated from the sample; one or a plurality of separators for separating and detecting a signal that is synchronized with the polarization modulation of the light source device from the signal outputted from the detector(s); and a signal processor for processing the signal from the separator(s)

Thus, the above-mentioned optical apparatus in accordance with the present invention has a construction such that the direction of polarized light that irradiates the tip part of the above-mentioned metal member can be switched to either linearly polarized light that is parallel to the direction of the point of the above-mentioned metal member or linearly polarized light that is perpendicular to the direction of the point.

Further, the above-mentioned optical apparatus in accordance with the present invention has a construction such that a polarization compensator whose transmittance or reflectance differs depending on the polarization is provided on an optical path of the above-mentioned optical apparatus, whereby the polarization characteristics of other optical components are compensated.

BRIEF DESCRIPTION OF THE DRAWINGS

FIG. 2 is a schematic perspective view showing one example where the present invention is applied to an optical recording/reproduction apparatus.

FIG. 3A is a perspective view of a cantilever having a metal pattern for exciting plasmons.

DETAILED DESCRIPTION OF PREFERRED EMBODIMENTS

Hereafter, various embodiments will be described with reference to the drawings.

The near-field light probes used in accordance with the present invention are roughly divided into those in a planar shape and those in the shape of a pyramid or a cone. When the sample has excellent planarity, such as a medium for optical recording and a semiconductor wafer, it is appropriate and effective to use a planer probe. In an optical recording/reproduction device, a planar head is used as well as a planar probe. In the case, as in the multi-purpose microscopic apparatuses, where inaccessibility of the near-field light to the sample due to unevenness of the sample presents a problem, the probe is formed into a subulate shape (for example, the shape of a multiangular pyramid shape or the shape of a cone) and scanning is conducted with the tip thereof tracing along a shape of the sample.

First, the planar probe and optical recording/reproduction device that uses it will be described. As the planer probe, a planar probe having the same metal pattern as that described in the above-mentioned conventional method (4) will be considered.

Figure 1A:
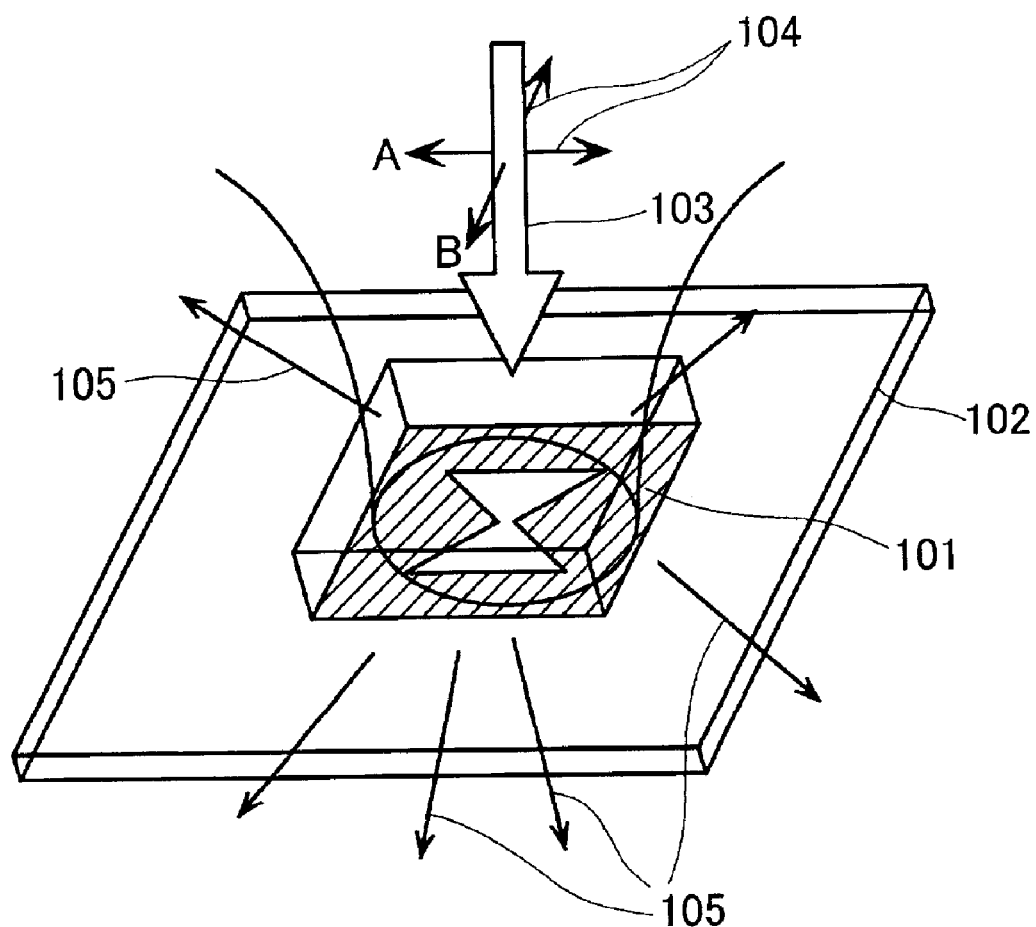
FIG. 1A is a diagram of the probe and the polarization modulation method in accordance with the present invention.
Figure 1B:
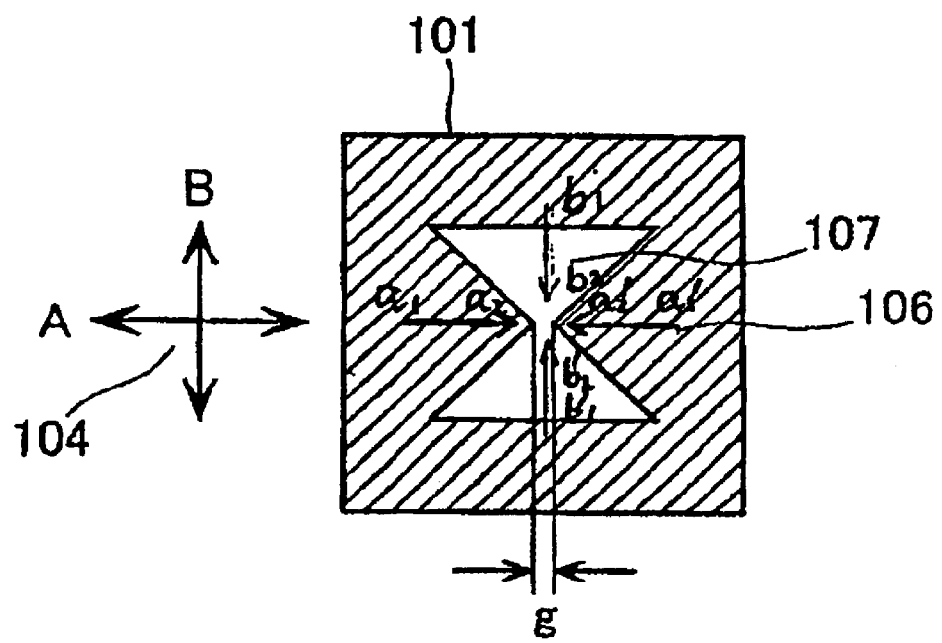
FIG. 1B is a diagram of the planar-type near-field light probe equipped with an anisotropic metal pattern having a micro spacing in it.

FIG. 1B shows, as one example thereof, the near-field light probe having a triangle-shaped metal pattern on a planar substrate. Note that contraction scales in the figure are not necessarily common for all parts. A right-angle-shaped-pattern (e.g. aluminum (Al) pattern) 106, such that the radius of curvature of its top end is 20 nm and the thickness is 30 nm is formed on a glass substrate 101 of 5 mm square, so that its whole shape becomes flat. A spacing g between apexes of the two opposing triangles is set to 10 nm.

Since the irradiation area of the incident light is equal to or more than the diffraction limit, if there are only patterns of the triangles, light passes through other portions and forms a large amount of background light. To shade this, the whole was covered with, for example, Al, as a metal member 106, and a non-coated area 107, which is not a metal member, is provided at the apexes of the triangles and their vicinity. That is, as shown in FIG. 1B, the metal member 106 forms two opposing triangles with the pointed parts or apexes of the triangles being spaced from one another by the spacing or gap g in the non-coated area 107 where no metal member 106 is disposed. Further, as show, the width of the triangles decreases monotonically or uniformly in the direction A. On the other hand, as show, in the direction B, which is orthogonal to the direction A, no pointed part exists. Since the transmittance decreases when the non-coated area 107 becomes smaller than the light wavelength, and when it is smaller than a half-wavelength, it decreases sharply; the non-coated area 107 is set equivalent to this or less. On the other hand, if the non-coated region is set too small, it shades and attenuates the plasmons excited at the apexes of the triangles and their vicinity; therefore, it needs to be set larger than a spread of the near-field light. Here, the non-coated area 107 is specified as an isosceles triangle with one side of 50 nm.

The substrate 101 may be made of any material that has a transparency to the incident light, other than glasses. Further, the metal pattern 106 may be made of a metal chosen from materials in which the plasmon resonance can take place. Here, the metal pattern 106 is fabricated by probe lithography, but the fabrication method is not limited to this and conventional fabrication methods different from this may be adopted.

If the direction of polarization 104 of the incident light 103 is in line with a direction A shown in FIGS. 1A and 1B, the localized plasmons are excited at the apexes of the two opposing triangles and their vicinity and intense near-field light is generated at the gap. Conversely, if the direction of polarization of the incident light is in line with a direction B shown in FIGS. 1A and 1B, the localized plasmons are less excited and the intensity of the near-field light generated at the gap is small. In this case, the intensity of the near-field light in the direction A is approximately 1000 times that in the direction B.

The substrate on which the sample is mounted or a recording medium 102 is disposed so as to oppose the metal pattern of the probe, and the distance between the probe and the sample or the recording medium 102 is controlled to be less than g. The near-field light generated at the apexes of the two opposing triangles and their vicinity is converted into propagating light 105 through interaction with the sample or the recording medium 102. The propagating light 105 also includes light leaking from the non-coated area 107, namely the background light, besides the scattered light of the near-field light. The scattered light of the near-field light reflects an optical property of a micro area of the sample or the recording medium 102. If the direction of polarization 104 is modulated between the directions A and B, the scattered light of the near-field light varies largely, but the background light exhibits no change. Thereby the propagating light 105 is observed in synchronization with the polarization modulation and only the scattered light of the near-field light is separated and observed.

Here a metal pattern in which the two triangles oppose each other is illustrated, but the present invention can be applied to other probes and apparatuses similarly.

FIG. 2 shows one embodiment in which this invention is applied to an optical recording/reproduction apparatus. A planar probe 201 according to the invention described with reference to FIG. 1A and FIG. 1B is mounted on a suspension 202 and is pressed to the recording disk 203. An actuator 204 is used for fine adjustment of the position for tracking. Light emitted from a diode laser 205 passes though a collimator lens 206 and a beam reshaping prism 207, and subsequently is guided to a polarization modulator 208, where its direction of polarization is switched to either the direction A or the direction B. After that, the light is focused on the planar probe 201 by a half mirror 209 and an objective lens 210.

Positioning of the objective lens 210 in a focusing direction is carried by an actuator 211. The above-mentioned components, except for the recording disk 203, are all arranged on a slider as constituent members of an optical head, and the position of the optical head is controlled by, an actuator for coarse tracking in the same manner as the normal optical head.

When performing recording, record marks are formed on the recording disk 201 by directly modulating the intensity of the diode laser 205. At this time, the polarization modulation by the polarization modulator 208 is stopped and the linearly polarized light is fixed so that the direction of polarization lies in the direction A. As another recording method, the intensity of the near-field light may be modulated by changing the direction of polarization with the polarization modulator 208, according to recording signals. In other words, the direction of the linearly polarized light is set in the direction A when the record mark is to be recorded; while, it is set in the direction B when the record mark is not to be recorded.

When performing reproduction, the presence and absence of the record mark on the recording disk 203 causes the scattering efficiency of the near-field light to be varied, and, accordingly, the intensity of light that returns to a direction of reflection is varied. This light, which is detected by a detector 213 using a focusing lens 212, is converted into an electric signal and subsequently is inputted into the lock-in amplifier 214. At this time, a driving signal of the polarization modulator 208 is used as a reference signal. Since the intensity of the near-field light is modulated in synchronization with the polarization modulation, the intensity of the scattered light of the near-field light by the record mark varies in synchronization with this and is detected as a signal by synchronous detection. However, since the background light in the case of normal incidence does not depend on the direction of polarization, the component of the background light included in the signal of the reflected light is removed by synchronous detection.

Thus, only the reproduction signal is extracted, and then the signal is sent to a signal processing circuit 215. Practically, since each of the optical components, starting with the half mirror 209, has a polarization dependency in its transmittance, the background light signal cannot be removed only by synchronous detection. Therefore, a polarization compensator 216 is provided and its inclination is set so that the background light becomes minimum. This is because the transmittance of a glass plate that is disposed with its normal inclined to the optical axis has different transmittances for s-polarized light and for polarized light, and the difference between them depends on the incident angle; and, hence, by choosing an appropriate incident angle, the polarization dependency of the transmittance or reflectance of each of the above-mentioned optical components can be canceled out, acting as a polarization compensator.

Here a glass plate that was angularly disposed was used as the polarization compensator. A dielectric multilayer film that is normally used as a polarization filter, a material having different absorption for a different direction of polarization, for example, a film that was doped with a dye and stretched in one direction, etc., may be used. The above-mentioned method, whereby the signal light is separated and detected in synchronization with the polarization modulation of the incident light, will be referred to hereinafter as "polarization modulation and synchronous detection method." With wider apex angles of the triangular tip parts of the probe shown in FIG. 1A and FIG. 1B, the intensity of the near-field light tends to be more intense. However, this apex angle has the highest S/N ratio when it is 90 degrees for the following reason.

At any edge parts of the metal, other than the apexes of the triangles where the localized plasmons are excited, enhancement of the near-field light by the surface plasmons occurs. When the direction of polarization of the light is orthogonal to the edge, this enhancement becomes maximum; whereas, when it is parallel to the edge, the enhancement becomes zero. Although the intensity of the near-field light at the edge parts is smaller than the intensity of the near-field light at the apexes by a few orders, the area of the edge parts is large and the intensity of that near-field light has a polarization dependency, so normally the component of its scattered light cannot be removed completely only by use of the above-mentioned synchronous detection. However, if the apex angles of the triangles are set to 90 degrees, both the polarized light whose direction of polarization lies in the direction A in FIG. 1 and the polarized light whose direction of polarization lies in the direction B have equivalent components, each projected in a direction orthogonal to a respective edge, and, hence, the intensities of the near-field light at the edge parts become equivalent; therefore, these components can be removed by synchronous detection. Therefore, when the near-field light generated at the edge parts of the triangles interrupts the measurement, it is recommend that the apex angles of the triangles be set to 90 degrees.

In this embodiment, an application of the invention to the optical recording method was described. However, this invention can also be applied to the opto-magnetic integration method. Further, in this embodiment, the light detector is provided in a direction of regular reflection, but the light detector may be provided in a direction of transmittance or in a lateral direction. A lubricant may be applied between the metal pattern of the probe and the recording medium. Further, by providing a thin film layer of a dielectric material or a semiconductor that transmits the incident light, for example, a glass material etc., on a plane where the metal pattern of the probe was provided, it is possible to protect the head and the recording material and to control the distance of the metal pattern.

Next, a pyramidal probe will be explained. In FIG. 1A, the metal pattern of the triangles was provided on the planar substrate, but it is recommended to provide the same pattern on a tip part of an acicular or needle-like member in order to enable the probe to accommodate the unevenness of a sample. For such a needle-like member, one having the shape of a cone, such as when a point of an optical fiber is sharpened by using a method of chemical etching or heat stretching, or one in the shape of a pyramid (shape of a multiangular pyramid), such as the probe for an atomic force microscope, may be used. In microscopic instruments, such as a micro fluorescent spectroscopic instrument and a micro Raman spectroscopic instrument, the wavelengths of the incident light and of the signal light do not necessarily agree with each other. For the above-mentioned needle-like member, a material that has a transparency at least to either of the incident light or the signal light should be used.

Figure 3B:
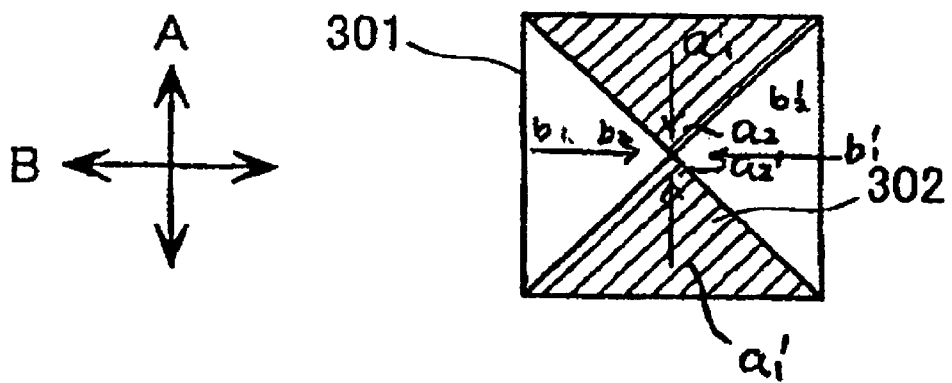
FIG. 3B is a diagram showing a quadrangular pyramid part of a top end thereof.

FIG. 3A shows a cantilever 300 made of SiN for the atomic force microscope on whose top end 301 a metal 302 was evaporated, as seen in FIG. 3B. Al was used for a metal. Here only two faces that oppose each other are provided with the metal film by means of evaporation from two directions, but only one face may be processed so. Further, as seen in FIG. 3B, a configuration is adopted where no gap exists at top ends of the metal films on the two opposing faces. Even with this configuration, intense near-field light is generated on side faces at the apexes and their vicinity. Needless to say, a gap may be provided at the apexes in the same manner as FIG. 1A and FIG. 1B.

The structure described up to this is the same as the pyramidal probe described with reference to the conventional method (5). However, with the structure as described, it is difficult to achieve a sufficient S/N ratio because the light passing through faces that are not covered with the metal forms a large amount of background light.

Figure 4:
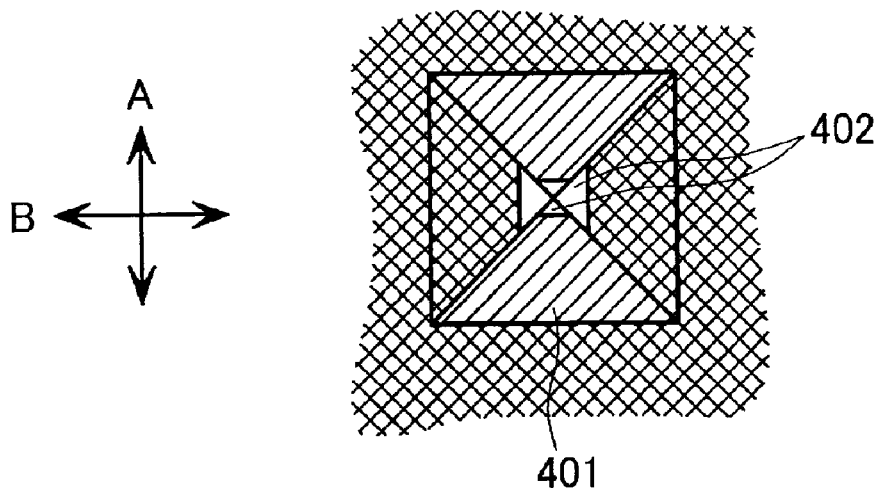
FIG. 4 is a diagram showing the quadrangular pyramid part of the top end of the metal pattern for exciting plasmons that has a metal part for shading.

As the simplest solution, there is a method of covering other faces with a metal 401 for shading, as shown in FIG. 4. However, since the metal for shading becomes parallel to a vibration direction of the electric field of the plasmons and weakens this, it must be separated at least from an excitation area of the plasmons. Therefore, non-coated parts 402 are provided on the top end of the metal for shading, as seen in FIG. 4. If the light passes through these parts, it becomes background light. To suppress this phenomenon, the non-coated parts 402 must be smaller than a half-wavelength of the said light. Even taking such a measure, there remains an opening anyhow, so that the light passes therethrough without fail; therefore, the background light cannot be removed completely.

In addition, in the case of the needle-like probe, there is another factor that makes removal of the background light incomplete as will be seen from the following discussion. To improve the spatial resolution of the apparatus, it is necessary to reduce the radius of curvature of the metal part at the top of the probe, and, for this purpose, it is necessary to reduce thin the thickness of metal at the top end to be equivalent to or less than the radius of curvature. If the thickness of metal is too thin, sufficient shading performance cannot be attained and the light passing through the metal part becomes background light.

Figure 5:
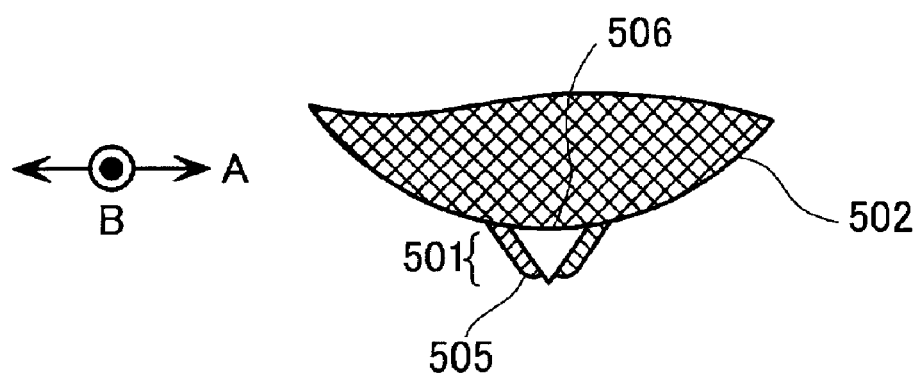
FIG. 5 is a side view of the quadrangular pyramid probe having two-step film thicknesses.

To solve this problem, the thickness of the metal is specified to be at two levels, as shown in FIG. 5. In other words, the metal thickness is reduced only for a top end 501, whereas the thickness of metal is ensured to be thick so as to attain sufficient shading property for a part other than the top end 501. The length of the top end 501 having the thin film should be as short as possible to suppress the background light, and one-half the wavelength of the light or less is desirable. However, to allow the probe to track the unevenness of the sample under observation, the length of the top end 501 having the thin film must be set to be longer than an undulation of the unevenness; therefore, the background light cannot necessarily be suppressed sufficiently.

As described in the foregoing, the background light can be suppressed with a specified structure of the probe, but it cannot be removed completely. However, for applications that requires especially high spatial resolution and for cases where the probe is applied to samples with considerable unevenness, a sufficient S/N ratio may be not attained; and, consequently, it is recommended to adopt the polarization modulation and synchronous detection scheme, as in the case of the planar probe mentioned above.

Further, if the polarization modulation and synchronous detection scheme is combined with the contrivance of the probe structure shown in FIG. 4 and FIG. 5, an even higher S/N ratio can be achieved. However, since the transmittance of the needle-like member is different for s-polarized light and for p-polarized light, respectively, this difference must be compensated to suppress the background light completely. This can be attained by controlling the thickness of the metal film provided on the needle-like member or by other ways.

Figure 6:
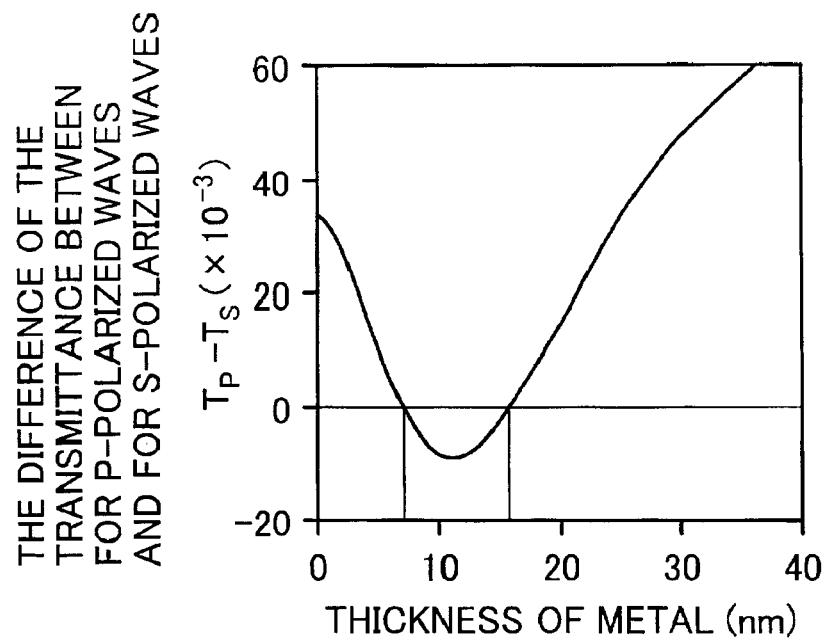
FIG. 6 is a graph showing Au film thickness dependency of the difference between the light intensity (Tp) that is transmitted and scattered by non-blocking part of the SiN-made quadrangular pyramid probe when the p-polarized light is incident thereon and the light intensity (Ts) that suffered the same when the s-polarized light is incident thereon.

FIG. 6 shows the dependency of the difference (Tp−Ts) between the intensity of the transmitted and scattered light for p-polarized light (Tp) and the intensity of the transmitted and scattered light for s-polarized light (Ts) on the metal thickness for the case where SIN is used for the needle-like member and gold (Au) is used for the metal film. In this case, if the film thickness of gold is chosen to be in the range of 7 nm to 15 nm, the polarization dependency of the intensity of the transmitted and scattered light is removed, hence the said synchronous detection scheme becomes capable of removing it. Since this film thickness depends upon the complex refractive indexes of the needle-like member and the metal, the film thickness must be chosen appropriately for the materials to be used. For example, when SIN is used for the needle-like member and Al is used for the metal, the optimum value becomes approximately 3 nm. If the film thicknesses of the above-mentioned metal for exciting plasmons and of the metal for shading are set to the said film thickness, the background light can be removed by the synchronous detection scheme; therefore, this method has an effect of simplifying the probe structure. To obtain an even higher S/N ratio, it is recommended that a thin portion of the top end 501 of the above-mentioned two-step film thickness probe be set to the said film thickness. Alternatively, independent from or in combination with these contrivances, the above-mentioned polarization compensator may be used.

If such a structure as shown in FIG. 5 is adopted, the plasmons are excited by the light polarized in the direction A at the metal tip for exciting the plasmons 505 of the top end 501. On the other hand, for the light polarized in the direction B, the plasmons are inevitably excited at a metal end part 506 provided for shading. If the plasmons generate signal light, the detected signal by the polarization modulation and synchronous detection scheme is decreased. To cope with this, it is necessary to take the length of the top end 501 enough with the intention of separating the sample from the metal for shading sufficiently. Still, it might not be avoided that both members become near because of the unevenness of the sample.

To solve this problem, a material having such a property that the generation efficiency of the plasmons at the said light wavelength is lower than that of the metal for exciting plasmons should be chosen. For example, it is appropriate to use Al as the metal for exciting plasmons and to use Au as the metal for shading for light having a wavelength of 400 nm. Naturally, for applications where the above-mentioned problems can be ignored, the same metal can be used for the metal for exciting plasmons and the metal for shading. Such cases have an effect in that the cost can be curtailed because the fabrication of the probe becomes relatively easy.

Figure 7:
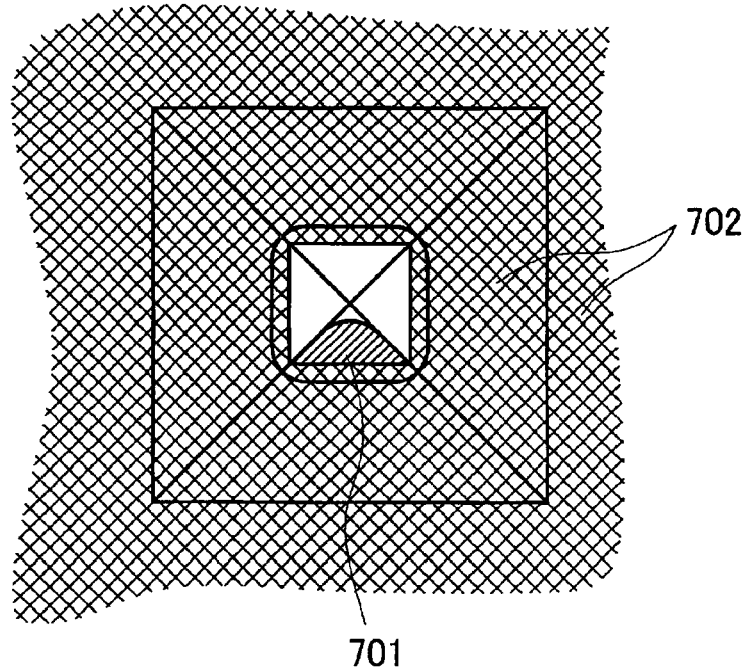
FIG. 7 is a diagram showing a tip of the quadrangular pyramid probe having the two-step film thicknesses and which has a metal for exciting plasmons only on one lateral face thereof.
Figure 8:
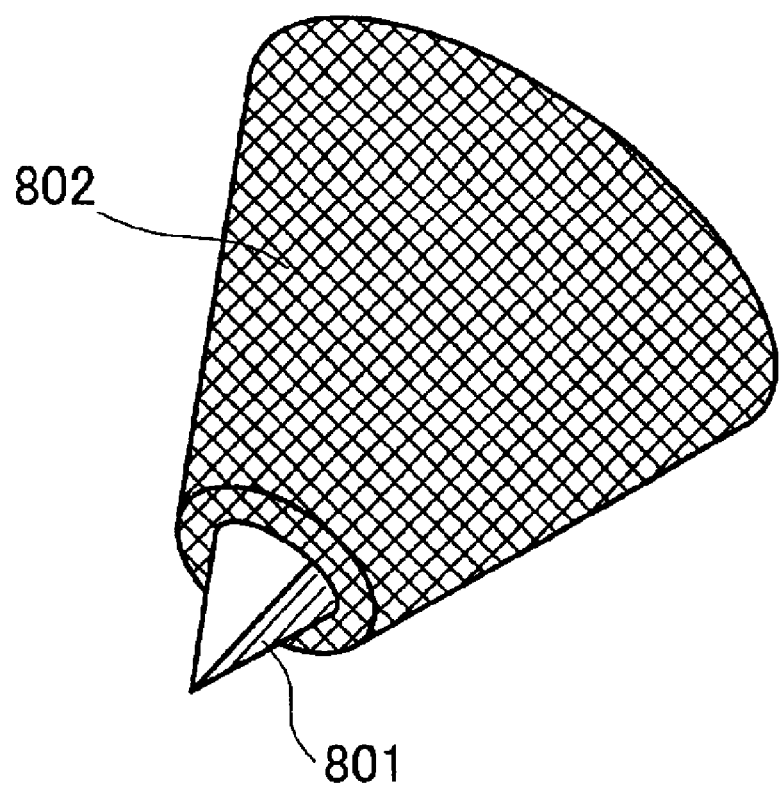
FIG. 8 is a perspective view of a sharply pointed optical fiber probe having the two-step film thickness structure.

FIG. 7 and FIG. 8 show other embodiments of the needle-like probe. FIG. 7 illustrates a probe fabricated by providing a metal for exciting plasmons 701 only on a single face of the above-mentioned quadrangular pyramid, and FIG. 8 illustrates a probe fabricated by evaporating a metal for exciting plasmons 801 on a half cone surface of the sharply pointed optical fiber.

Note that the structures shown in FIG. 7 and FIG. 8 are only examples. For the pyramidal probe and the conical probe, two metals for exciting plasmons may be opposed as shown in FIG. 4, the pyramid or cone may be covered with the metal up to the top of that subulate geometry, as shown in FIG. 8, or there may be a slight gap between the metal parts, as shown in FIG. 7. Moreover, for all the structures described, the kind and the thickness of the metal for shading and those of the metal for exciting plasmons may be changed or may be unchanged. These variants may be used properly according to applications of use and the cost.

Next, a method of fabrication of the above-mentioned probe will be described. When only one side of the needle-like member is to be provided with a metal, the metal is evaporated only from one direction. When the non-coated part is provided at the top and its vicinity and when two-step film thicknesses are formed, the following procedures were used.

First, a target face (or side) of the needle-like member is provided with the metal thin film by the above-mentioned method. Photoresist is applied on that part and left with the end part turned up, and, thereby, the film thickness of the resist at the end part becomes thin. Subsequently, when the resist is subjected to a baking process and is dry etched, the metal begins to be etched from the end part where the resist film thickness is thin. By properly adjusting the etching time, the length of the nonmetal coated part can be controlled. When two-step film thicknesses are intended, the metal that acts as a metal for exciting plasmons at the said wavelength is formed and then a different kind of metal for shading is evaporated thereon. Subsequently, the probe is subjected to a resist-etching process by the same method as described above. In this process, if an etching gas is used that has a fast etching speed for the metal for shading, but has a slow etching speed for the metal for exciting plasmon, only the metal for shading is removed at the top end, so that the two-step film thicknesses can be realized. Further, if at first the metal for shading is provided also on a face other than the face where the metal for exciting plasmon was provided, and, second, the film thickness and the etching time of the two kinds of metals in the above-mentioned method are properly chosen, then the structure that has both the two-step film thicknesses and the non-coated part, as shown in FIG. 5, can be manufactured.

Here, for the needle-like member, a cantilever made of SIN for the atomic force microscope was used. First, on the opposing two faces, Al was evaluated to a 10 nm thickness as the metal for exciting plasmons, and then W was evaporated to a 100 nm thickness as the metal for shading over all faces. Etching was conducted with $CH_4$ gas in the above-mentioned procedures to fabricate the structure of FIG. 5.

Next, referring to FIG. 9, one embodiment where the polarization modulation and synchronous detection scheme was applied to the near-field optical microscope will be described. A sample 903 to be measured is placed on a transparent substrate 902 that was disposed on a scanning stage 901 capable of three-dimensional position control. A cantilever-type probe 904 that has metal parts at the end part, as mentioned above, is disposed so as to face the sample. Here, position control is carried out using the dynamic force method, that is commonly used in the probe microscope, and the distance between the sample 903 and the probe 904 is controlled to be approximately 5 nm. For this purpose, the probe 904 is vibrated in the vertical direction using a dither piezo 905. Note that a laser and a split photodiode that are used to observe the probe vibration and an optical system associated with this are elements that already known, and hence are not shown in the drawings.

The distance between the sample and the probe needs to be set to a value not more than the length of permeation of the near-field light, so that the two members may be in contact with each other. For the distance controlling method, other methods that are normally used in the probe microscope, such as the tunnel current controlling method and the optical lever method, may be used. Especially, since this invention does not need such vibration of the probe to remove the background light as needed by the conventional method (6), it has an effect of circumventing both a decrease In the resolution associated with the probe vibration and a complication of an observed image associated with inclusion of false signals on condition that a method for controlling the distance that requires no vibration of the probe is adopted at the same time.

Output light of a diode laser 907 is collimated by a lens 908, its direction of polarization is switched to the direction A and the direction B, as shown in FIG. 5, at regular intervals by a polarization modulator 909, and after being transmitted through a polarization compensator 910, it is guided to the top of the probe 904 by an objective lens 11. The sample 903 is illuminated with the intense near-field light generated at the top of the probe to radiate the signal light.

Here, an example where the transmitted light of the sample is detected as the signal light is shown. The transmitted light is guided to a light detector 921 by a lens 920, is converted into an electrical signal, and is subjected to the synchronous detection by a lock-in amplifier 930. A reference signal at the time of the detection is obtained from the polarization modulator 909. An output of the lock-in amplifier 930 is fed into a controller 931. The sample plane is scanned with the aid of the scanning stage 901, the output of the lock-in amplifier 930 is measured at each position, and the output signals are converted into an image by using the controller 931 that doubles as an image processing apparatus; and, thereby, the optical signal image of the sample can be obtained. Representing the frequency of the polarization modulation by a symbol f and a time constant of the synchronous detection by a symbol T, f is set to be sufficiently larger than 1/T.

Figure 9:
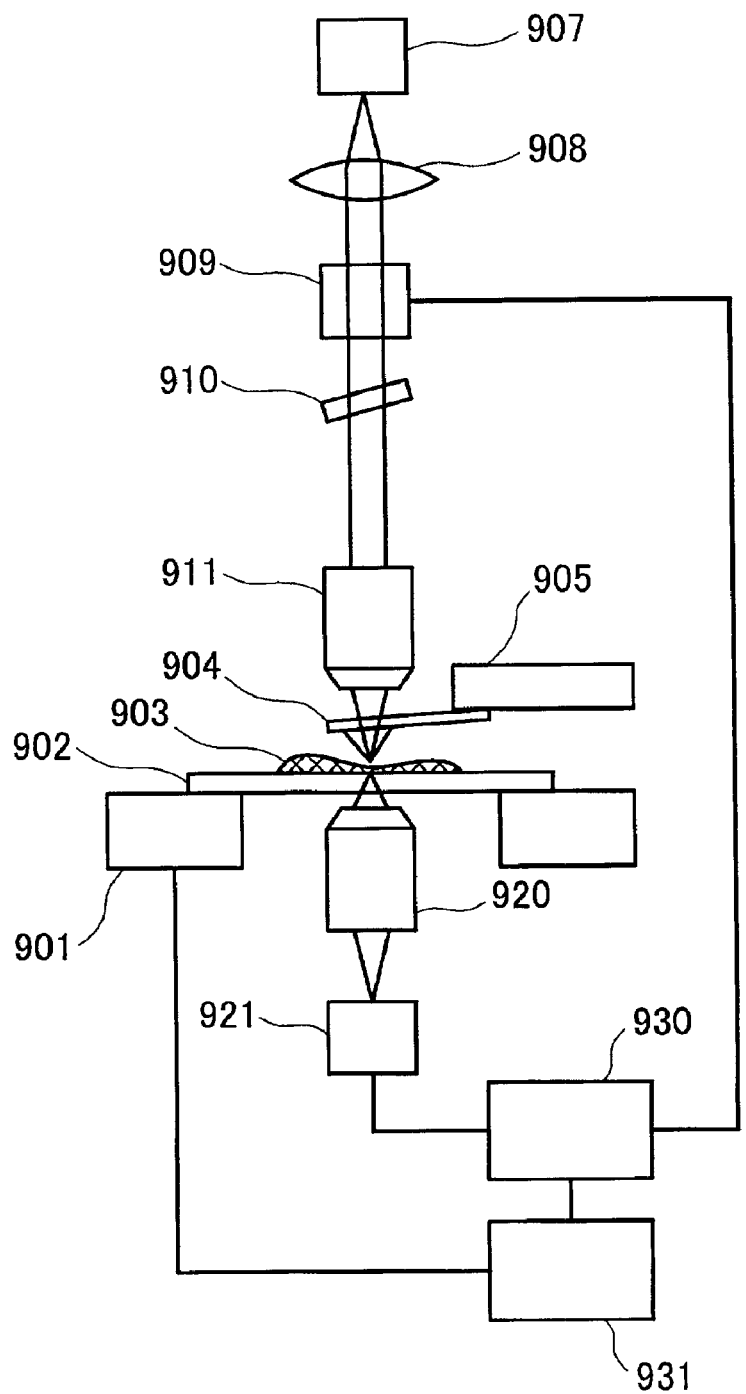
FIG. 9 is a schematic block diagram showing an example of an apparatus where the present invention is applied to a near-field optical microscope.

Note that in FIG. 9, a mechanism for observing the sample position is omitted, but that an illumination system as used in a normal microscope and an observation system for visual inspection or for a television camera etc. are properly provided to the optical apparatus. Depending upon the optical components provided in the optical path, there may be a case where the light becomes elliptically polarized light, and, hence, the sensitivity of this method is lowered. In such a case, it is recommended that a phase compensating plate, such as Babinet compensator etc., be used.

This embodiment uses the transmitted light as signal light. However, the present invention can be applied to other microscopic instruments that use other light than transmitted light. Even in the case where the signal light is one of reflected light, scattered light, florescent light, Raman light, etc., a similar measurement can be performed on condition that optical components used normally, a spectroscope, etc. are attached thereto. Further, in the case where the sample exhibits macroscopic anisotropy and the intensity of the background light-induced fluorescent light differs for polarization, a polarization compensator may be adjusted, so that such inequality becomes a minimum.

Moreover, in the case where photoconductivity of the sample is measured, a photoconductive signal should be subjected to synchronous detection using the lock-in amplifier 930.

In this embodiment, the incident light is guided to the probe to irradiate the sample, and the signal light propagating in a direction of transmission is detected. However, other illumination and another detection configuration that is normally used in the near-field optical microscope may be used. In other words, one of the following configurations may be used: (1) a configuration where the incident light is guided to the probe to irradiate the sample and the signal light radiated in a direction of reflection is detected; (2) a configuration where the incident light is guided to the probe to irradiate the sample and the signal light returning to the probe is detected; and (3) a configuration where a top end of the probe is illuminated from the outside and the signal light entering the probe is detected. In the configuration where the incident light is guided to the probe to irradiate the sample and the signal light returning to the probe is detected, reflected light from various faces of the probe generally forms a large amount of background light, and hence the present invention becomes especially useful. Further, in the case of measurement where the probe is not made to follow the unevenness of the sample, the planar probe shown in FIG. 1A may be used.

Next, a further embodiment according to the present invention will be described. The probe used in accordance with the present invention is easy to fabricate and its fabrication method is easy and gives high reproducibility compared to the heat drawing method etc. Therefore, multi probes can be arranged easily.

Figure 10A:
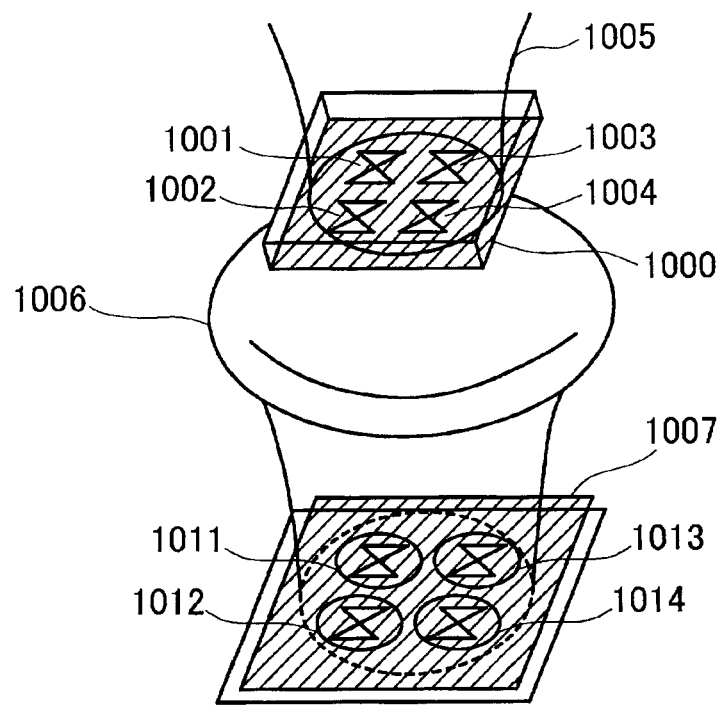
FIG. 10A is a diagram showing a construction where a plurality of probes are used.

FIG. 10A is an example where four planar probes are arranged. Four patterns shown in FIG. 1A are arranged on the substrate 1000. At this time, the centers of the probes 1001 to 1004, namely, the locations where the near-field light is generated, are arranged so as to be separated from each other by a distance larger than diffraction limit. Incident light 1005 is polarization-modulated, irradiates the probe so that the centers of the probes are irradiated uniformly, and is imaged on an image plane 1007 to form an enlarged image of a plane of the probe, using an optical system 1006. On centers of the image of the probe's centers so obtained, detectors 1011 to 1014 are arranged, and each output of the detectors is detected synchronously with lock-in amplifiers. Although omitted in the drawing, the subject under measurement is placed between the substrate 1000 and the optical system 1006. Other points are the same as the above-mentioned embodiment.

Here, a configuration where single incident light 1005 is used to illuminate all the probes is used. However each probe may be illuminated with separate incident light, or each group of plural probes may be illuminated with separate incident light. Alternatively, the incident light may be scanned to illuminate the probes therewith sequentially. Here, an embodiment where four probes were used was described, but many more probes may be formed according to applications. In such a case, the same number of light detectors should be prepared for the respective probes.

The light detectors 1011 to 1014 in FIG. 10A may be replaced with a single image pickup tube. With this replacement, signal lights from the centers of the probes can be detected at the same time. At this time, if the control signal for polarization modulation of the incident illumination light is synchronized with a vertical synchronizing signal of the image pickup tube, the signal caused by incident polarized light whose direction of polarization is orthogonal to that of an adjacent frame is detected; therefore, the background light can be removed by subtraction between the signals of adjacent frames. Although this scheme provides a lesser improvement effect of the S/N ratio compared to the case with the use of a lock-in amplifier, simplification of the apparatus and curtailment of the cost become possible.

Figure 10B:
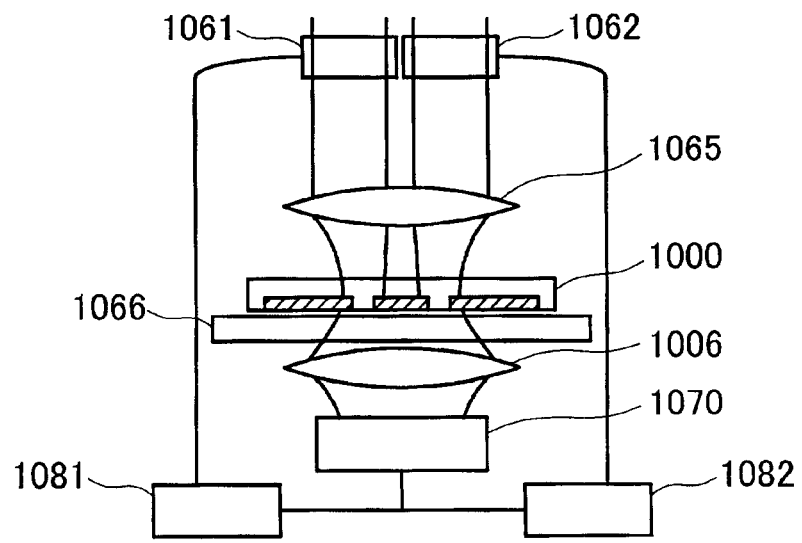
FIG. 10B is a diagram showing a different construction where a plurality of probes are used.

FIG. 10B shows another example of an apparatus construction where a plurality of probes are used. Here, to simplify the drawing, a case where two probes are used is shown. Two beams of light from light sources (not shown in the drawing) are modulated with respective modulation frequencies using polarization modulators 1061 and 1062. Thus, the plasmons excited by each probe are modulated for intensity by a different frequency, respectively. In this case, the light sources may be separately provided or may be a single source. For a case of multi probes, use of a single light source together with a liquid crystal spatial modulator as a polarization modulator makes the construction simple because the polarization modulation can be conducted for each probe.

A light signal from the subject under measurement 1066 is subjected to photoelectric conversion by the single detector 1070 and subsequent branching, and is detected synchronously by lock-in amplifiers 1081 and 1082. Here, the subject under measurement means, for example, the actual sample or the substrate on which the sample is mounted. Since the lock-in amplifiers conduct synchronous detection using reference signals from corresponding polarization modulators, respectively, outputs from the lock-in amplifiers 1081 to 1084 correspond to light signals from the centers of the probes 1001 to 1004, receptively. With this arrangement, the detectors can be unified to one detector, hence enabling miniaturization of the device.

Here the embodiment with the two probes was described.

Many more probes may be provided according to applications in the same manner as the above-mentioned embodiment.

If a plurality of probes are arranged on a single slider, the speed of the reproduction of light can be enhanced. To enhance the speed of the optical recording as well, there may be adopted a configuration where the same number of the incident light sources as the probes are prepared, and each light source is made capable of irradiating each center of the probe independently, which enables independent writing.

Further, if the multi probes described in this embodiment are applied to a microscopic instrument, measurement and observation of a large area can be performed in a short time. For example, this scheme can be used in microscopes, micro-spectroscopic instruments, optical lithography, optical processing equipment, etc. A scheme of position control in this case is shown in FIG. 11A and FIG. 11B.

Figure 11A:
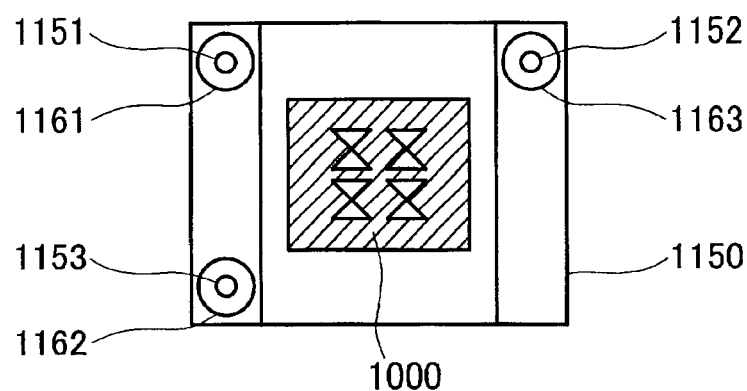
FIG. 11A is a diagram showing a part of the substrate where a plurality of probes are used.

In FIG. 11A, a substrate 1000 with multi probes arranged thereon is fixed to a supporting plate 1150. On three points of the supporting plate 1150, metal needles 1151 to 1153 are provided. These needles each are made of a probe of a tunnel microscope and are applied with a tunnel current to enable measurement, respectively. These needles are disposed on piezo-electric actuators 1161 to 1163, respectively, and are capable of adjusting the lengths they protrude from the substrate separately.

Figure 11B:
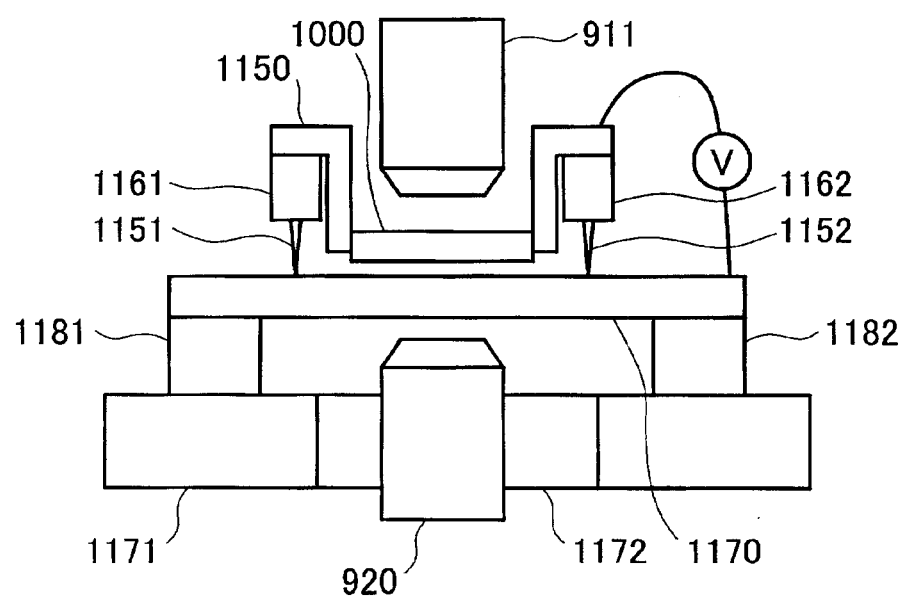
FIG. 11B is a diagram illustrating the distance control between the substrate and the sample.

In FIG. 11B, first the metal needles 1151 to 1153 are set so as not to protrude beyond a bottom surface of the substrate 1000, and the substrate 1000 is brought to adhesion on a flat sample 1170. Under this condition, the voltages applied to the piezo-electric actuators 1161 to 1163 are adjusted so that the tunnel currents following in the metal needles 1151 to 1153 become equal. Next, a constant bias voltage is added to the voltages that have been applied to the piezo-electric actuators 1161 to 1163 to cause the metal needles to protrude from the substrate. The previously determined tunnel currents are specified as set values, and then the voltages applied to the piezo-electric actuators 1181 to 1183 are controlled so that the tunnel currents of the metal needles 1151 to 1153 are always at the set values, respectively. The piezo-electric actuator 1183 is not shown in the figure, but is arranged in the same manner as the piezo-electric actuators 1161 to 1163, so that the angle of elevation of the sample 1170 can be adjusted using three support parts. The distance between the sample and the substrate is adjusted with the above-mentioned set values of the bias voltage and the tunnel current. With this arrangement, the stage 1171 carrying the sample thereon can be scanned while parallelism between the flat sample 1170 and the substrate 1000 is maintained. The stage 1171 has a hole 1172 that enables the objective lens 920 for condensing the transmitted light to access the flat sample 1170.

Here the piezo-electric actuators 1161 to 1163 are used to adjust the protruding lengths of the metal needles 1151 to 1153. However, use of metal spheres having the same particle size, instead of the metal needles, makes it possible to eliminate the provision of the piezo-electric actuators 1161 to 1163. Further, in this embodiment, a planar probe was described, but a plurality of pyramidal or conical probes may be arranged instead.

For multi-point observation of a sample having poor flatness, a Si thin film substrate is suitable as the substrate on which multi probes are arranged. This has a merit that adhesion with the sample can be improved because it allows light in a visible radiation range to pass through and is flexible as well. When performing a measurement, a voltage is applied between the sample and the patterns of the metal for exciting plasmons and the metal for shading to effect adhesion between them. Subsequently, the applied voltage is turned off, the sample is scanned, and the position is changed to perform the next measurement. Other points of the construction and procedures are the same as those of the above-mentioned embodiment, and an explanation thereof will be omitted.

Furthermore, for multi point measurement of a sample having even worse flatness, it is recommended to adopt a construction where a plurality of cantilevers, that each have a pyramidal or conical probe, as shown in FIGS. 3, 4, 5, 7, and 9, or those that each have a planar pattern, as shown in FIG. 1A, in a previously flattened part at the top of the subulate part, are arranged, and the distance between each cantilever and the sample is controlled independently. For the distance control between the individual cantilever and the sample, well know schemes, such as the optical lever scheme and the dynamic force scheme, should be employed. Note that, in this case, the sample is not moved as in the case of the above-mentioned embodiment for distance control, but a construction is adopted where the cantilever side is moved. Moreover, alternatively, if the sample is pressed to the cantilever without actively performing distance control, all the cantilevers can be made to contact the sample through manipulation of respective cantilevers, even in the case where the sample has an unevenness. Note that, for members for absorbing the unevenness of the sample, the cantilever is not necessarily needed, but any member having a spring mechanism may be used.

When a multi-point probe is used, image data whose spatial resolution is much the same as the distance between the probes, namely, the diffraction limit of light in the present case, can be obtained even without scanning the sample or the substrate. Therefore, the sample can be observed beforehand with low resolution, and, hence, this case has an advantage in that a part of interest can easily be found.

In the embodiments described up to here, the polarization modulator that uses the electrooptic effect was used to modulate the polarization of the incident light, but other well-known methods, such as a photoelastic modulator and a rotating half-wavelength plate, may be used. Further, the polarization modulation is conducted to switch the two directions of the linearly polarized light, but the linearly polarized light may be rotated continuously.

However, these polarization modulators normally have large sizes and require application of high voltages or driving devices. Therefore, they have higher costs and are difficult to miniaturize, which may become a problem especially when being used in optical recording/reproduction apparatuses.

Figure 12:
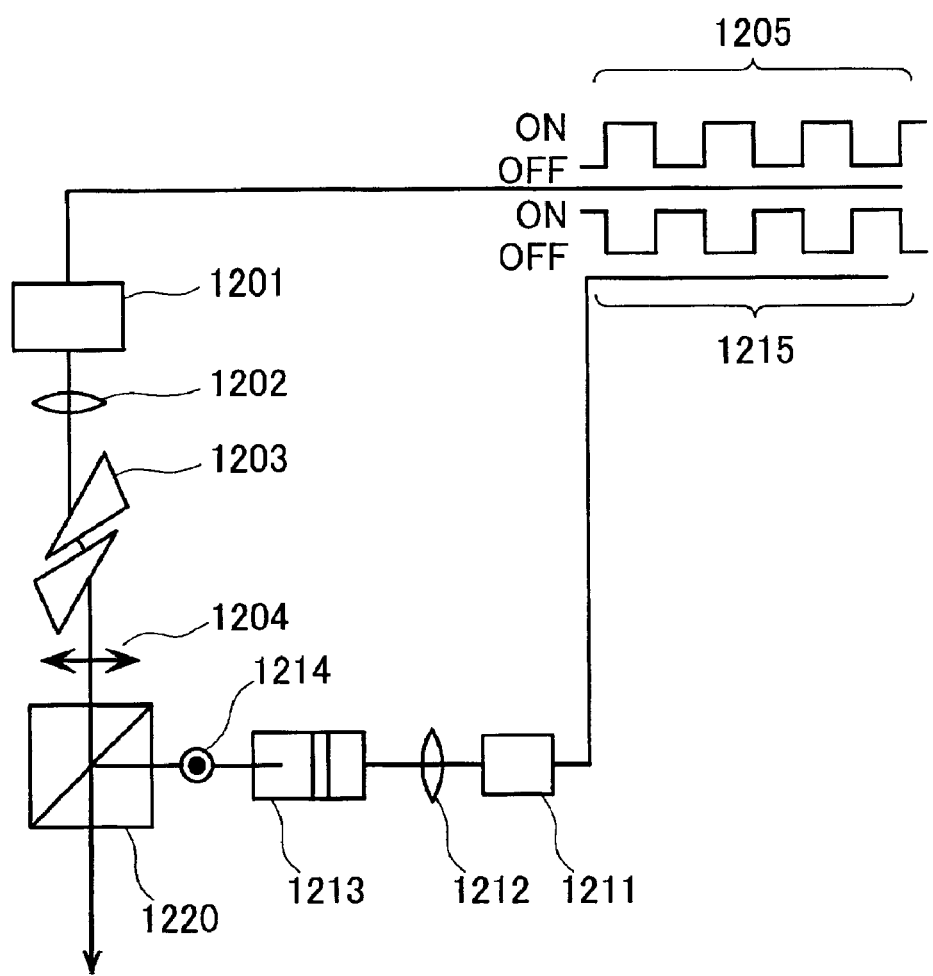
FIG. 12 is a schematic diagram illustrating an example of a construction that realizes polarization modulation.

Referring to FIG. 12, an example of polarization modulation means that is intended to hold down the cost and realize a space saving will be described. A diode laser 1201 and a diode laser 1211 are arranged so that the directions of linear polarization of the two output lights 1204, 1214 become orthogonal to each other. Two beams of the output light pass through collimator lenses 1202, 1212 and beam reshaping prisms 1203, 1213 and subsequently are guided to the same light path by a polarizing beam splitter 1220. It becomes possible to switch the direction of polarization by shifting phases of signals 1205 that drive the diode laser 1201 and of signals 1215 that drive the diode laser 1211 by 180 degrees and by switching the diode laser 1201 and the diode laser 1211 alternately.

Figure 13:
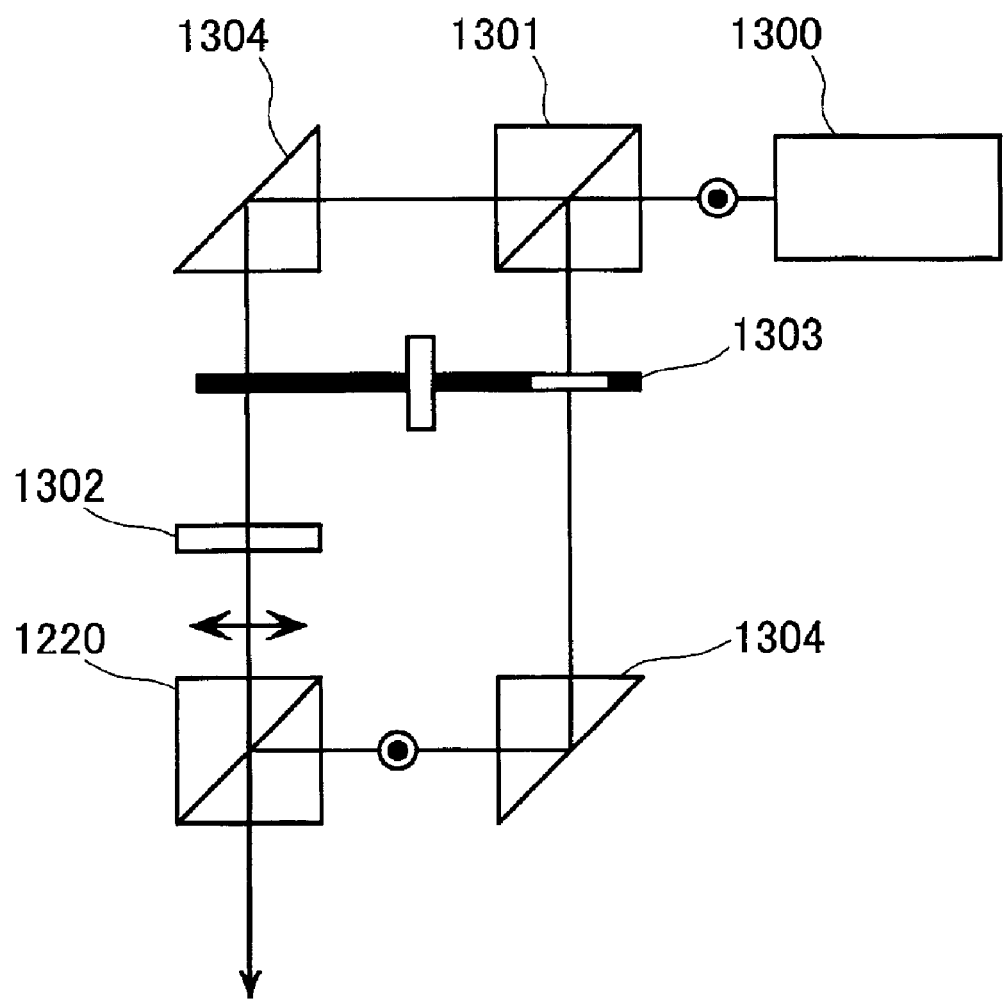
FIG. 13 is a diagram illustrating another example of a construction that realizes polarization modulation.

Here, diode lasers are used, but any laser that can switch the output alternately or that is equipped with a mechanism whereby the switching can be conducted with the use of an external intensity modulator or a shutter may be used. An example of this is shown in FIG. 13.

In this scheme, a single laser 1300 of linear polarization is used rather than preparing a plurality of diode lasers. Output light of the laser 1300 is branched into two parts using the beam splitter 1301, the polarization of one part is rotated by 90 degrees using a half-wavelength plate 1302, and then the two parts are interposed on the same axis using the polarizing beam splitter 1220. A light chopper 1303 has such a blade configuration such that, when the one of two parts of the light passes through it, the blade blocks the other part, so that two parts of the light are allowed to pass therethrough alternately. With this embodiment, an inexpensive measurement instrument can be constructed.

Further, by combining the optical pulse trains from the two mode-locked lasers that have mutually-orthogonal linearly-polarized light and which lase at a synchronized repetition frequency so that light pulses from the one laser are interposed between those from the other laser, there can be obtained light whose direction of polarization was modulated similarly.

Furthermore, in the embodiments described in the foregoing, a lock-in amplifier is used to extract a signal component that is synchronized with the polarization modulation. However, for a simple configuration, a frequency filter that allows the modulation frequency to pass through may be used to extract it, which is subsequently amplified and rectified. This variant is effective, especially for an optical recording/reproduction apparatus that is required to be low-cost and space-saving.

According to the present invention, in optical apparatuses that use near-field light, compatibility between achievement of high resolution and improvement of the S/N ratio, that are normally a trade-off, can be realized.

What is claimed is:

1. An optical apparatus comprising:
   a light source;
   a metal member disposed on a planar substrate so as to have at least one pointed part with a width which monotonically decreases in a first direction and delimiting a gap in an area where no metal member is disposed, and where no pointed part exists in a second direction which is orthogonal to the first direction;
   a polarization modulator which switches a direction of polarization of light from the light source between orthogonal directions in which one of the directions is parallel to the first direction and an other direction which is parallel to the second direction;
   an optical member for irradiating the gap and the pointed part with light from the light source through the polarization modulator;
   a detector for detecting at least one of light having passed through an object and light which is at least one of reflected and scattered by the object; and
   a separator for removing a signal caused by background light and for extracting only a signal of near-field light from the signal outputted from the detector by using synchronous signal detection with switching of polarization direction by the polarization modulator.

2. An optical apparatus according to claim 1, wherein an apex angle of the at least one pointed part of the metal member is 90°.

3. An optical apparatus according to claim 1, wherein the object is a recording medium and the metal member having the at least one pointed part disposed on the planar substrate is composed in a planar shape.

4. An optical apparatus that uses near-field light, comprising:
   a light source device;
   a needle type of probe having a part which is covered with at least one metal member and with a sharpened tip part at an end of the probe where a plasmon is excited by the light from the light source device, and an other part at which a nonmetal is exposed at a surface of the probe where substantially no plasmon is excited;
   a sample support for holding a sample;
   a distance controller for controlling a distance between the surface of the sample and the sharpened tip part of the probe;
   a polarization modulator for modulating a direction of polarization of light from the light source device between orthogonal directions in which one of the directions is parallel to a direction in which a width of the tip part of the probe having the metal member monotonically decreases and an other direction which is orthogonal thereto;
   an optical member for irradiating the tip part of the probe having the metal member with light from the polarization modulator;
   at least one detector for detecting signal light which is at least one of radiated from the sample and at least one of reflected and scattered by the sample;
   at least one separator for removing a signal caused by background light and for extracting only a signal of near-field light from a signal outputted from the at least one detector by using synchronous signal detection with switching of polarization direction by the polarization modulator; and
   a signal processor for processing the signal from the at least one separator.

5. An optical apparatus according to claim 4, wherein the probe has a shape of a multi-angular pyramid or a shape of a cone with one face thereof or opposing two faces thereof being provided with the metal member.

6. An optical apparatus according to claim 5, wherein one portion of the faces of the probe other than faces on which the metal member is provided are coated with a predetermined metal so as to provide a non-coated portion of the faces at an end of the tip part which non-coated portion delimits a gap which is smaller than a half-wavelength of the light of the light source device.

7. An optical apparatus according to claim 6, wherein the predetermined metal used for coating is a metal different from the metal member.

8. An optical apparatus according to claim 5, wherein the thickness of the metal member that is provided on the probe is controlled to a predetermined thickness so that the optical apparatus is constructed in such a manner that an optical signal that has passed through the probe as a propagating light and is detected by the at least one detector is suppressed.

9. An optical apparatus according to claim 4, wherein an apex angle of the tip part of the metal member of the probe is 90°.

* * * * *